UNITED STATES PATENT OFFICE.

CARL DITTMAR, OF CHARLOTTENBURG, PRUSSIA.

IMPROVED EXPLOSIVE AGENT, CALLED "XYLOGLODINE."

Specification forming part of Letters Patent No. 99,069, dated January 25, 1870.

I, CARL DITTMAR, of Charlottenburg, in the Kingdom of Prussia, have invented a new and Improved Explosive Agent, which I call Xyloglodine, of which the following is a specification:

*Nature and objects of the invention.*

Though, for blasting purposes, xyloglodine may be used singly, it is intended to be mixed with prepared cellulose or other porous substances, explosive or inexplosive, by which process a powder is produced, known by the name of dualin, of which I am also the first and sole inventor.

Xyloglodine is a fluid of a milky, reddish, or white color, and of a consistency that, according to the process of manufacture, will vary from that of ordinary sirup to that of thick broth.

Xyloglodine differs from the explosive agent called nitro-glycerine or nitroleum, especially in the following points, to wit:

*a.* Xyloglodine can be exploded like common gunpowder, and does not require the use of a cap.

*b.* Xyloglodine is less sensitive to cold than nitro-glycerine.

*c.* Xyloglodine is stronger than nitro-glycerine.

*d.* Xyloglodine is, in its manufacture and handling, less dangerous than nitro-glycerine.

Xyloglodine consists of nitric and sulphuric acid, and of glycerine-starch, or glycerine-cellulose, or glycerine-mannite, or glycerine-benzole, or analogous substances.

1. Sulphuric acid of commerce is boiled with pulverized charcoal until it is rendered free from nitrogen, and reaches a density of 67° Baumé. For this purpose an iron or glass apparatus may be used.

2. Nitric acid, of 48° to 50° Baumé, is thoroughly purified.

3. These prepared acids are mixed in the proportion of about one and a half part of sulphuric acid to one part of nitric acid. The mixture is allowed to stand in a closed vessel for from eight to fourteen days before using it, during which time it is subjected to blasts of dry, hot air, for the purpose of freeing it from nitrogen. Instead of using one and a half part of purified sulphuric acid, of 67° Baumé, one part of the same and one-half part of fuming sulphuric acid, to one part of nitric acid, may be used.

4. *a.* Glycerine-starch is prepared by roasting starch on iron plates until it turns reddish or yellowish brown, when it is, in different proportions, mixed with glycerine of at least 30° Baumé, which it is desirable should be free from fatty acids, lime, and chlorine.

*b.* Glycerine-cellulose is prepared by treating sawdust, preferably obtained from wood of soft texture, with diluted acids—for instance, hydrochloric acid—and boiling it with an alkali until it is rendered a chemically pure cellulose. This is dried, finely pulverized, and roasted until it turns to a yellowish-brown color, by which process its chemical character, analogous to the process applied in the preparation of glycerine-starch, is changed, until it becomes a cellulose, containing less hydrogen and oxygen than nitro-starch or nitro-cellulose prepared in the ordinary manner. If it is desirable, for specific purposes, the cellulose may be charred. This prepared cellulose, or prepared charred cellulose, is now mixed with anhydrous glycerine in different proportions, the cellulose remaining floating in the liquid.

*c.* Glycerine-mannite is prepared by drying the mannite thoroughly, finely pulverizing it, and mixing it in different proportions with anhydrous glycerine of at least 30° Baumé.

*d.* Glycerine-benzole is prepared by mixing, in different proportions, benzole or benzole-tolnole with anhydrous glycerine of 30° Baumé.

5. Glycerine-starch, glycerine-cellulose, glycerine-mannite, glycerine-benzole, or any of the substances prepared in an analogous manner, is now mixed with the mixture of acids described under No. 3, in the proportion of one pound to from eight to ten pounds of the mixed acids. In order to render this process safe and expeditious, I apply my newly-invented apparatus, for which Letters Patent have been sought. The glycerine-starch, glycerine-cellulose, or glycerine-mannite are left in the mixture from ten to twenty minutes, according to the quantity used.

6. The whole mass is now either treated to a bath of pure water, or is placed in an iron or leaden vessel, when the acids will readily separate from the nitrated compounds, which are removed and subjected to further treatment. The acids drawn off may be segregated, and rendered again serviceable for sundry purposes.

7. The nitrated substances, being separated from the acids, are placed in a bath of soda-lye, and are stirred in it until they impart a blue color to reddened test-paper.

8. They are again washed in pure water, and then rendered anhydrous by being placed in flat chambers, and dried with sulphuric acid and chloride of calcium, during which process the temperature must not exceed 50° centigrade.

Having now fully described the nature of my invention, and the mode of executing the same, what I claim as my invention, and desire to secure by Letters Patent, is—

1. The process of manufacture or preparation of my new and improved explosive agent, which I call xyloglodine, substantially in the manner and for the purposes set forth.

2. The new compound called xyloglodine, made by the above-mentioned process.

CARL DITTMAR.

Witnesses:
W. M. MEW,
V. SUHELIHA.